(12) United States Patent
Coleman

(10) Patent No.: US 11,643,348 B2
(45) Date of Patent: May 9, 2023

(54) METHOD FOR HIGH EFFICIENCY BIOLOGICAL PHOSPHORUS AND NITROGEN REMOVAL IN A SEQUENCING BATCH REACTOR ACTIVATED SLUDGE PROCESS

(71) Applicant: DENTRO-P, LLC, Yakima, WA (US)

(72) Inventor: Thomas E. Coleman, Yakima, WA (US)

(73) Assignee: DENTRO-P, LLC, Yakima, WA (US)

( * ) Notice: Subject to any disclaimer, the term of this patent is extended or adjusted under 35 U.S.C. 154(b) by 0 days.

(21) Appl. No.: 17/358,176

(22) Filed: Jun. 25, 2021

(65) Prior Publication Data

US 2021/0403353 A1    Dec. 30, 2021

Related U.S. Application Data

(60) Provisional application No. 63/046,503, filed on Jun. 30, 2020.

(51) Int. Cl.

| | | |
|---|---|---|
| *C02F 3/30* | (2006.01) | |
| *C02F 3/12* | (2006.01) | |
| *C02F 3/28* | (2006.01) | |
| *C02F 101/16* | (2006.01) | |
| *C02F 101/10* | (2006.01) | |

(52) U.S. Cl.
CPC ............ *C02F 3/301* (2013.01); *C02F 3/1215* (2013.01); *C02F 3/2866* (2013.01); *C02F 3/308* (2013.01); *C02F 2101/105* (2013.01); *C02F 2101/16* (2013.01); *C02F 2209/04* (2013.01)

(58) Field of Classification Search
CPC ...... C02F 3/301; C02F 3/1215; C02F 3/2866; C02F 3/308; C02F 2101/105; C02F 2101/16; C02F 2209/04; C02F 3/1263; C02F 3/006; Y02W 10/10
USPC .......................... 210/605, 614, 630, 903, 906
See application file for complete search history.

(56) References Cited

U.S. PATENT DOCUMENTS

| | | | | |
|---|---|---|---|---|
| 6,882,419 B2 * | 4/2005 | Coleman | ............... | G01N 33/146 |
| | | | | 436/110 |
| 8,568,592 B2 * | 10/2013 | Coleman | ................. | C02F 3/006 |
| | | | | 210/906 |
| 10,934,195 B1 * | 3/2021 | Flippin | ................... | C02F 3/301 |

FOREIGN PATENT DOCUMENTS

| | | | |
|---|---|---|---|
| CA | 2481853 A1 | * | 4/2006 |
| CA | 2583752 A1 | * | 4/2006 |
| CN | 201343460 Y | * | 11/2009 |
| KR | 100327154 B1 | * | 3/2002 |

(Continued)

*Primary Examiner* — Fred Prince
(74) *Attorney, Agent, or Firm* — Svendsen Legal, LLC

(57) ABSTRACT

A wastewater treatment method applicable to new or existing enhanced biological phosphorus removal (EBPR) treatment process designs which utilize the sequencing batch reactor (SBR) process activated sludge process treatment tanks. The method improves the performance and efficiency in the treatment of municipal and industrial wastewater to remove phosphorus (P) and nitrogen (N). The method includes ceasing reaction cycles when a derivative of rate of change of the input flow volume of the air stream into the tank needed to maintain a low-range of dissolved oxygen (DO), in which an oxidation reduction potential (ORP) setpoint reaches a derivative value indicating that conversion of the ammonia nitrogen in the influent wastewater content to a nitrite or to a nitrate is complete.

10 Claims, 7 Drawing Sheets

Schematic diagram of the sequencing batch reactor cycles

(56) References Cited

FOREIGN PATENT DOCUMENTS

KR 100414417 B1 * 1/2004

* cited by examiner

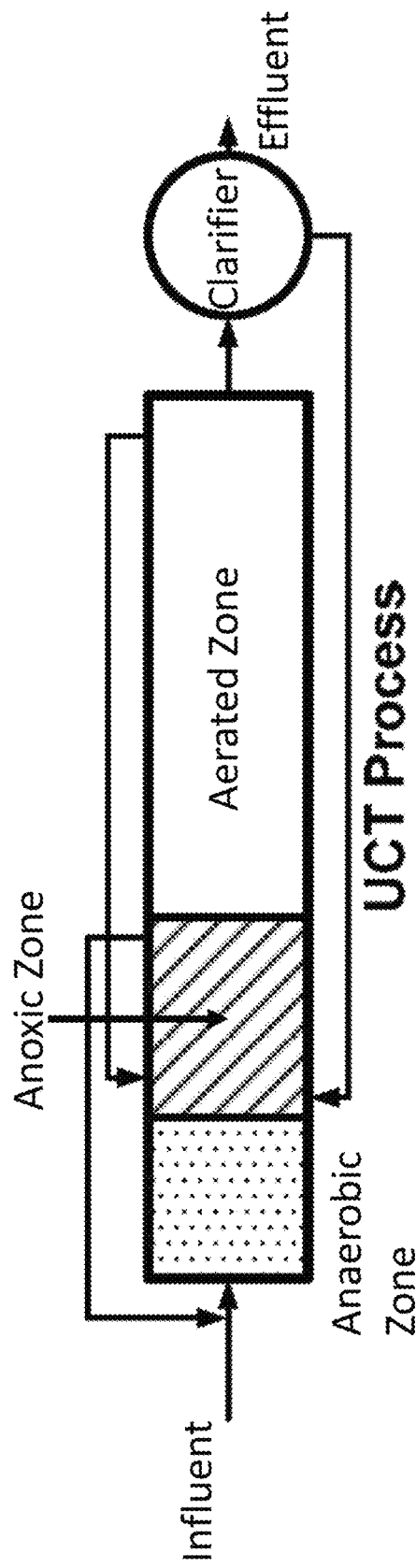
Figure 1. UCT Process Schematic [Prior art]

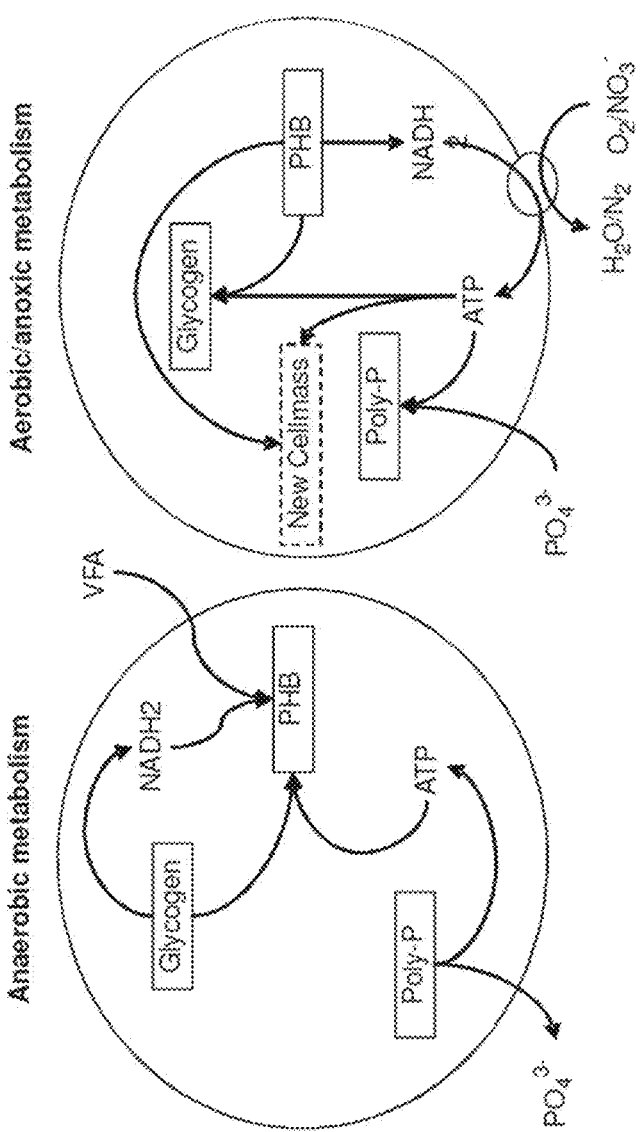
Figure 2. Metabolism of phosphorus accumulating organisms (PAOs) under anaerobic and oxic conditions [Prior Art]

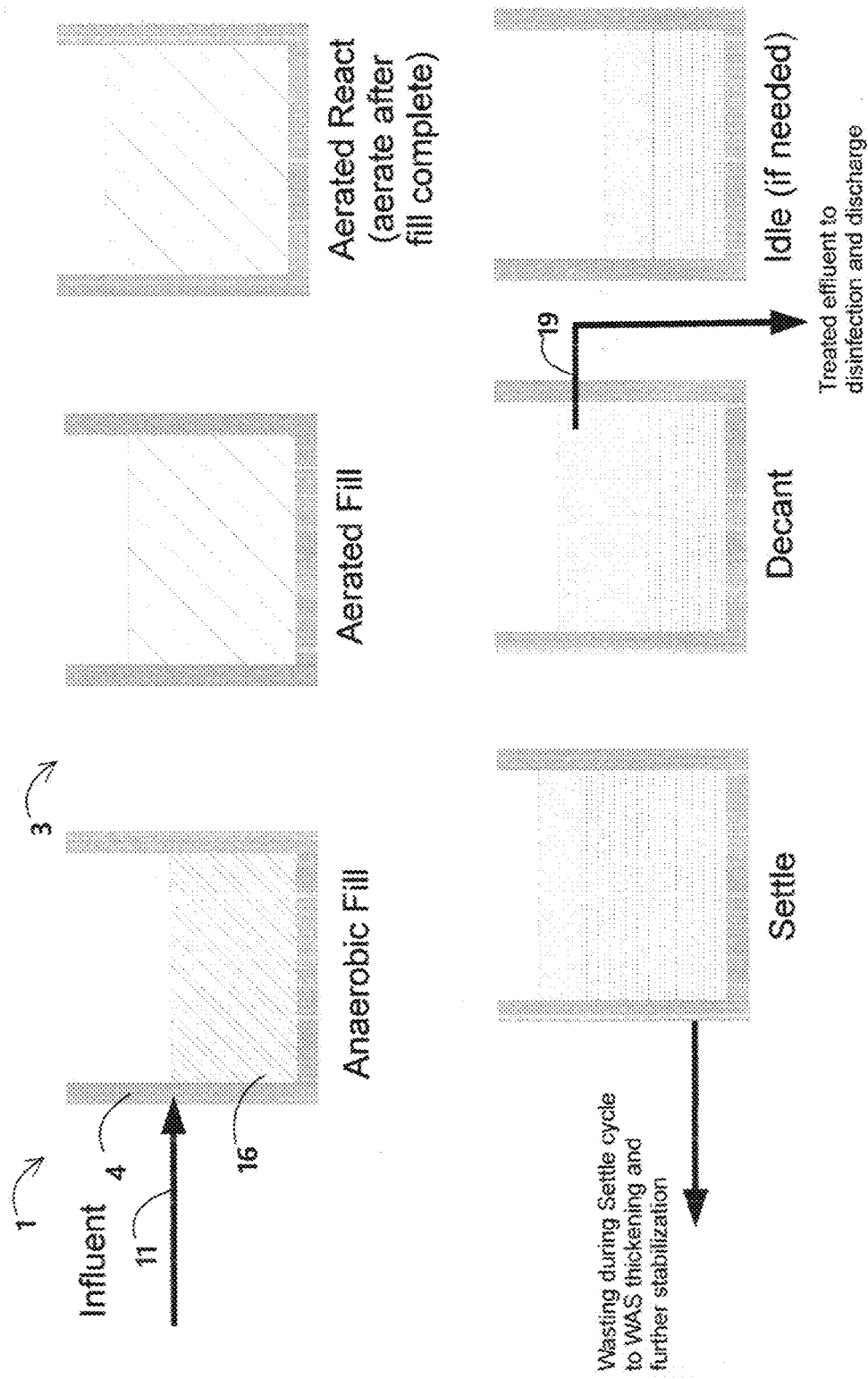
Figure 3. Schematic Diagram of Cycles in a Typical Sequencing Batch Reactor (SBR) Design [Prior Art]

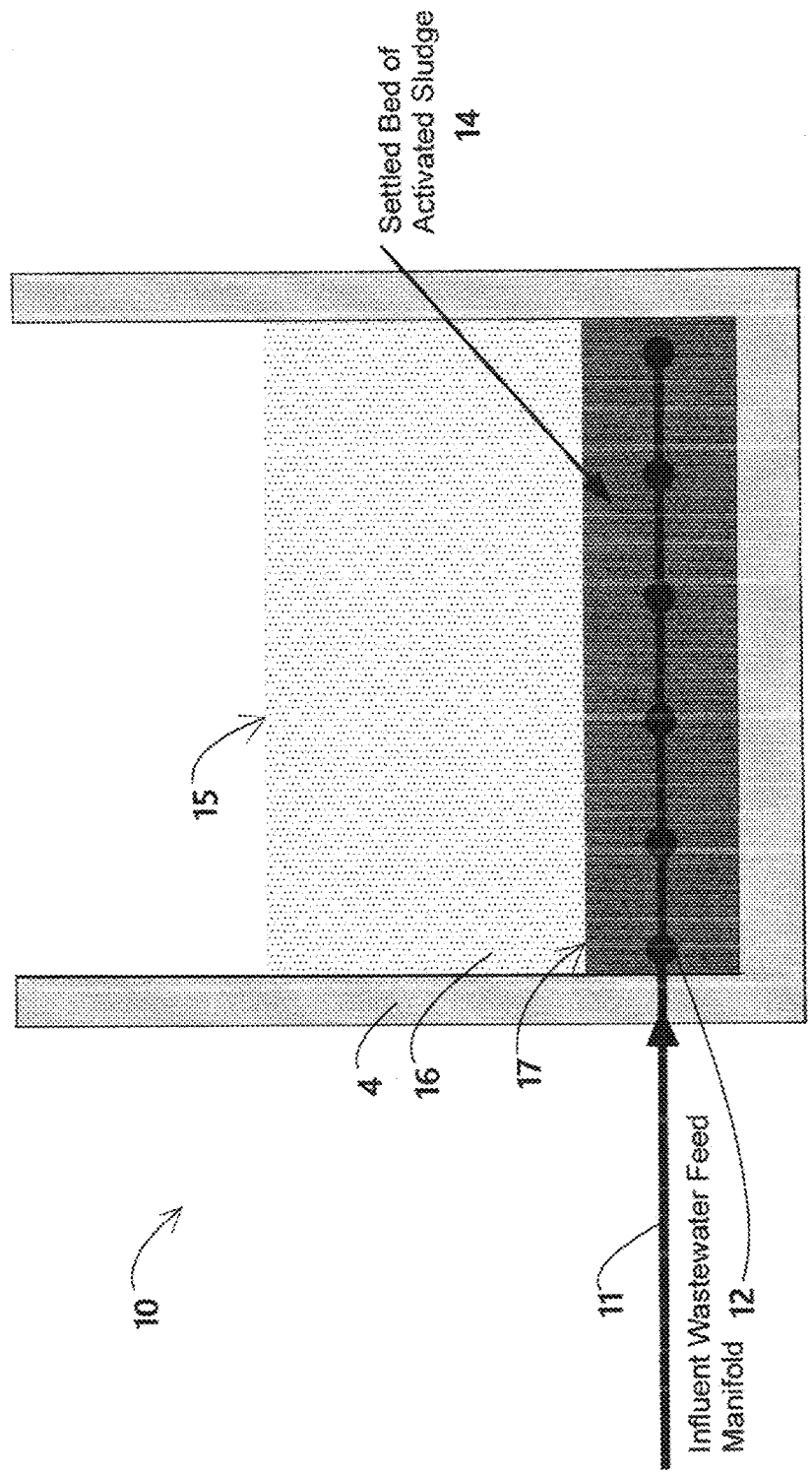
Figure 4. Anaerobic Feed Cycle detail used in a sequencing batch reactor (SBR)

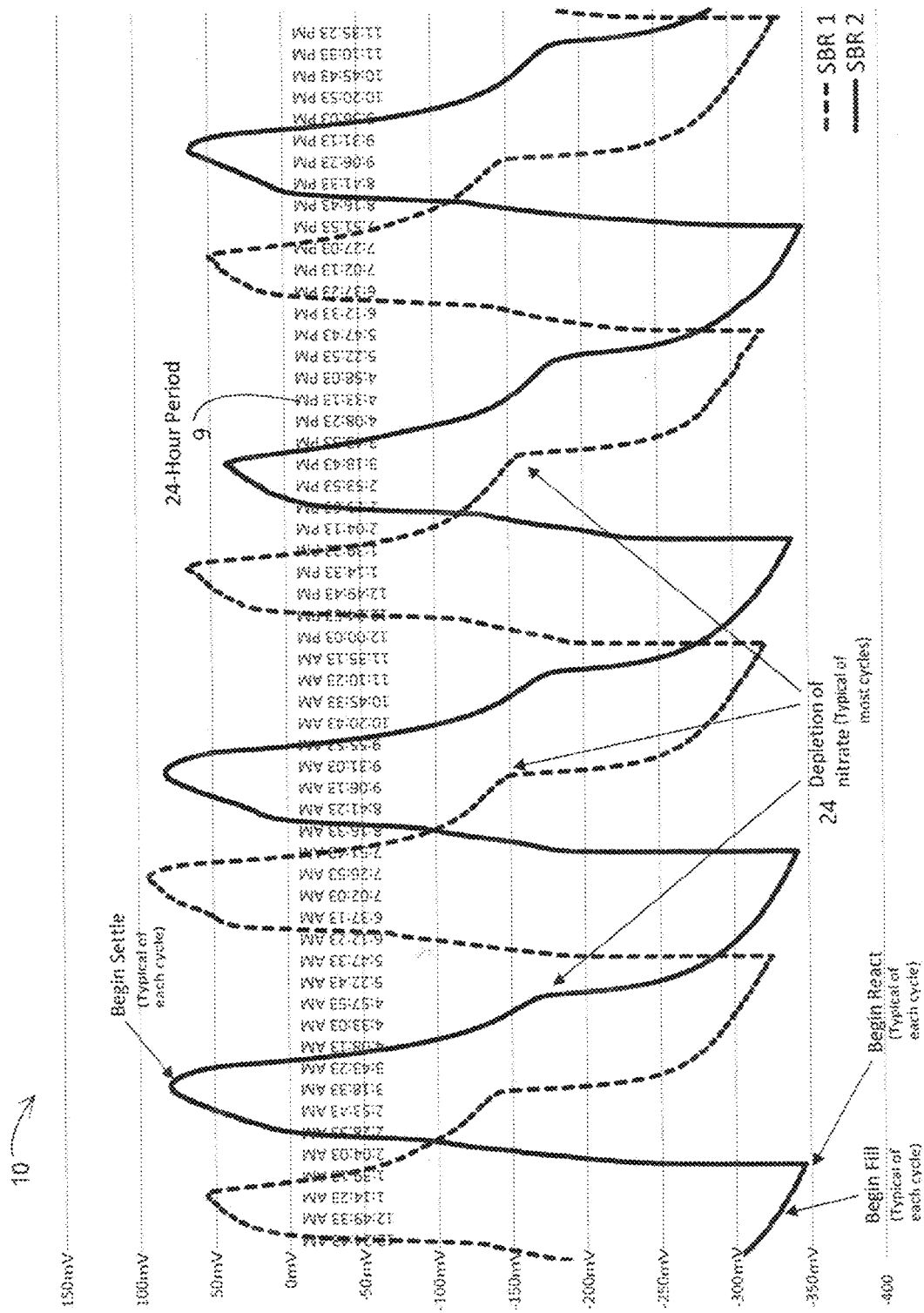
Figure 5. Typical 24-hour chart of ORP vs. time in a 2-SBR system

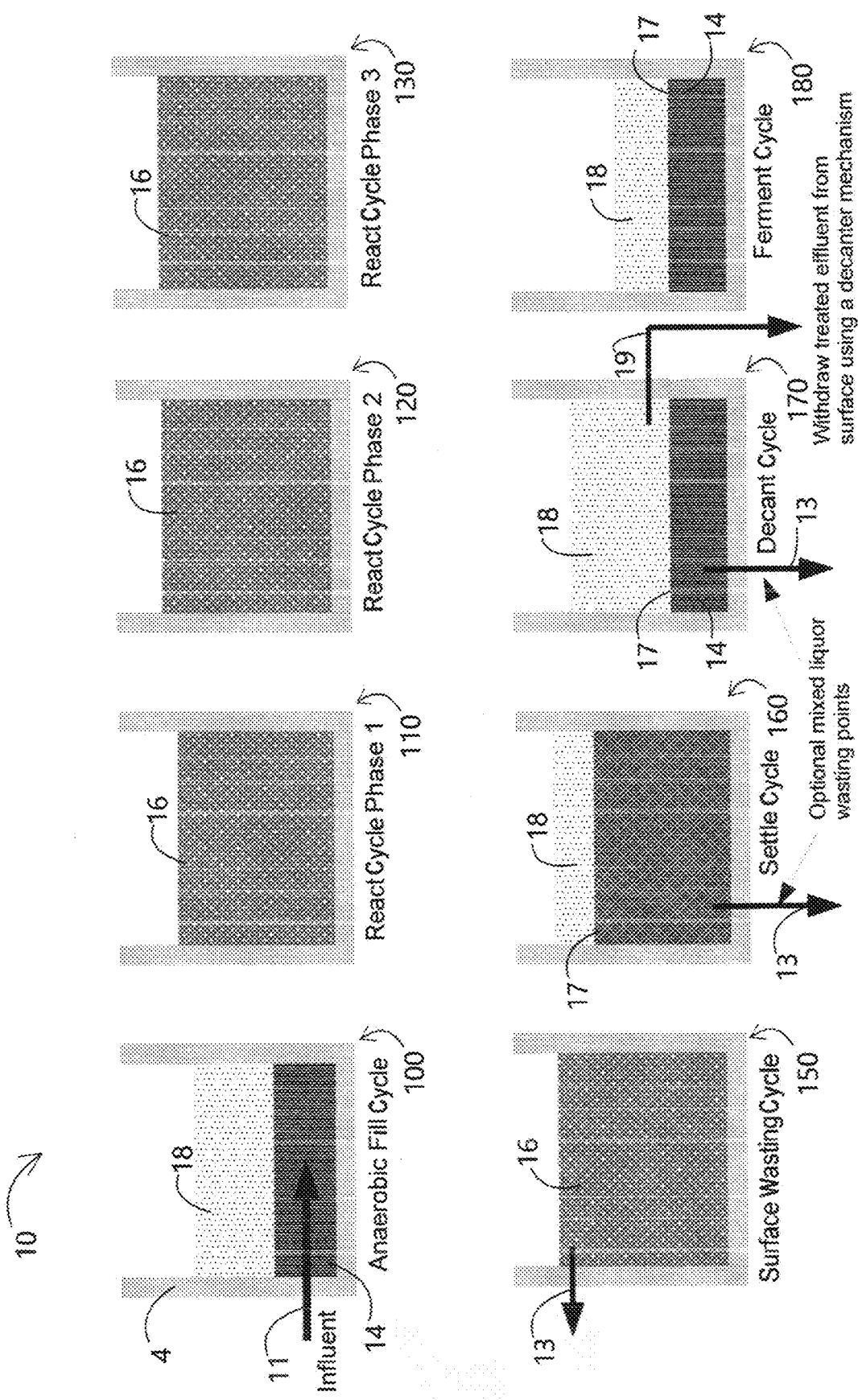
Figure 6 Schematic diagram of the sequencing batch reactor cycles

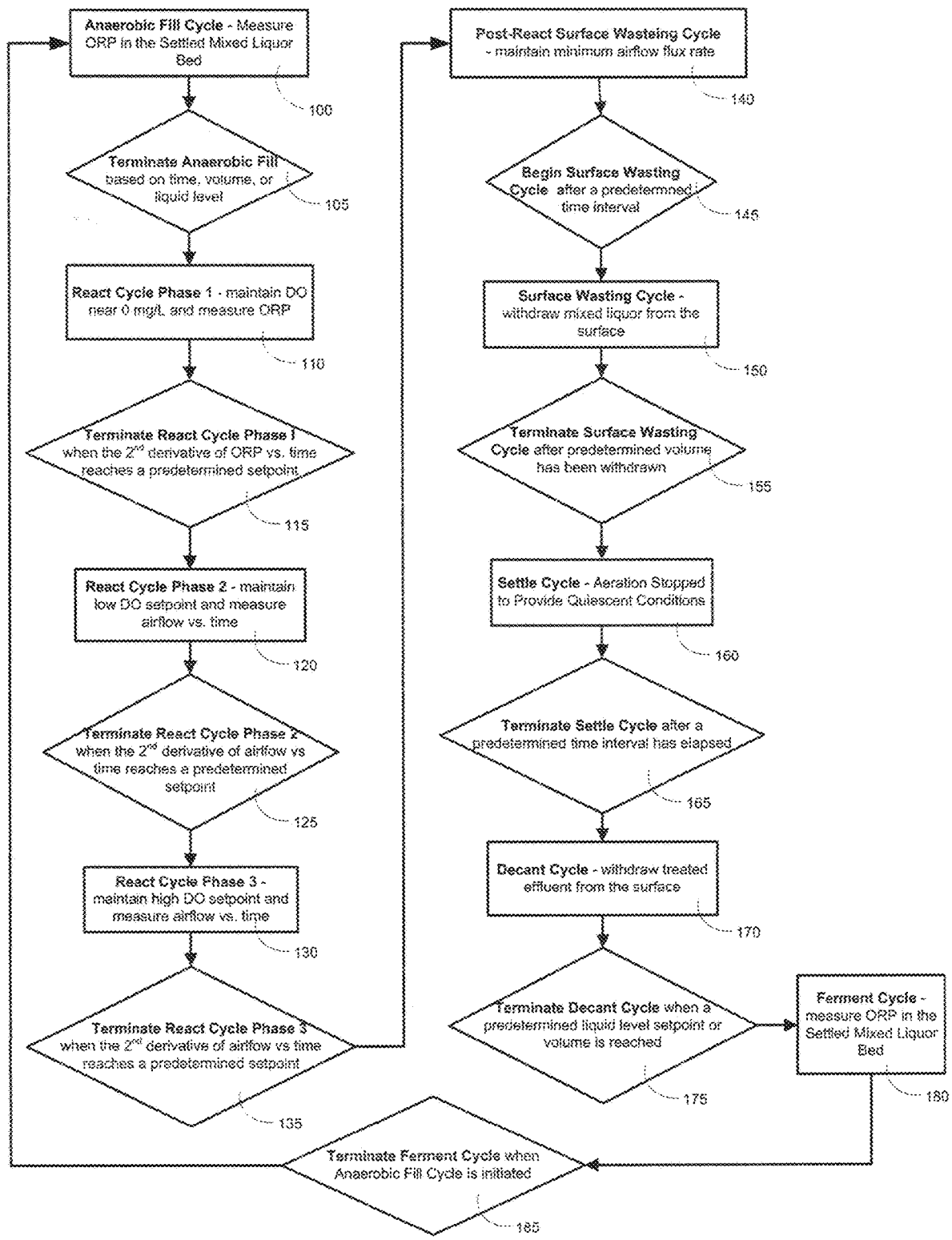
Figure 7. SBR Process Control Logic Diagram

METHOD FOR HIGH EFFICIENCY BIOLOGICAL PHOSPHORUS AND NITROGEN REMOVAL IN A SEQUENCING BATCH REACTOR ACTIVATED SLUDGE PROCESS

TECHNICAL FIELD

The present disclosure relates to processing municipal and industrial waste water in a batch reactor or tank. More specifically, the present disclosure relates to a method for processing an activated sludge for a high efficiency biological removal of phosphorus and nitrogen in sequential steps within a batch reactor.

BACKGROUND

Human activities can accelerate the rate at which nutrients enter ecosystems. Phosphorus (P) is often the limiting nutrient in cases of eutrophication in lakes and rivers subjected to runoff and/or point source pollution from wastewater treatment plants.

At the same time, phosphate rock from which P fertilizers are produced is a non-renewable resource which is being rapidly depleted. More effective process control systems will help to promote the maximum use of EBPR where chemical precipitation for P removal might otherwise be used. This is also important because P can be recovered as a by-product of EBPR systems for beneficial use as fertilizer, while P from chemical precipitates removed using metal salts cannot be effectively recovered.

It is becoming increasingly common for regulatory agencies to impose limits on phosphorus as well as nitrogen on discharges from wastewater treatment plants. The biological removal of both nutrients is more complex since the efficiency of both processes is dependent, in part, on the available organic carbon (C) substrate in the influent wastewater or from an external source, when necessary.

One of the molecular detection methods commonly employed is the fluorescent in situ hybridization technique (FISH) targeting the 16S ribosomal RNA (rRNA) using oligonucleotide probes (short sequences of nucleic acids). DNA and RNA oligonucleotide microarrays and quantitative polymerase chain reaction (qPCR) targeting 16S rRNA and the polyphosphate kinase 1 gene from environmental microbial populations have been used.

Microbial community structure and properties significantly affected by the operating conditions and control strategies which are employed in different wastewater treatment facilities. Molecular detection methods allow us to better understand the impact of specific control actions on the microbial community and on the specific organisms which are likely to predominant under a given set of operational conditions. Better integration of knowledge and tools between the disciplines of engineering and microbial biology is helping us to realize more fully, the great potential of environmental biotechnology.

In a conventional biological nitrogen removal (BNR) wastewater treatment plant, nitrogen removal is achieved through nitrification and denitrification. Nitrification is the oxidation of ammonium to nitrate, catalyzed by bacteria, and is a key part of global nitrogen cycling. Denitrification is the biological reduction of nitrite and nitrate to nitrogen gas by heterotrophic bacteria consuming organic carbon in the absence of oxygen (defined as anoxic condition). In the first step of nitrification, chemolithoautotrophic ammonia-oxidizing bacteria (AOB) oxidize ammonium to nitrite. Nitrite is subsequently oxidized to nitrate by the nitrite-oxidizing bacteria (NOB).

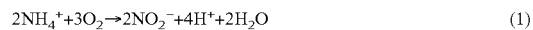
$$2NH_4^+ + 3O_2 \rightarrow 2NO_2^- + 4H^+ + 2H_2O \tag{1}$$

$$2NO_2^- + O_2 \rightarrow 2NO_3^- \tag{2}$$

Data from 16S rRNA catalogs first demonstrated that there are two phylogenetically distinct groups of autotrophic AOBs. One of these contained *Nitrosococcus oceanus*, and was within the gamma-subdivision of the *Proteobacteria*. The AOB in the beta-subdivision formed two deep branches; *Nitrosomonas* and *Nitrosospira*. All isolated chemolithoautotrophic, nitrite-oxidizing bacteria belong to one of four different genera; *Nitrobacter* (alpha subclass of *Proteobacteria*), *Nitrococcus* (gamma subclass of *Proteobacteria*), *Nitrospina* (delta subclass of *Proteobacteria*), and *Nitrospira* (phylum *Nitrospira*).

It had long been assumed that *Nitrosomonas* spp., were responsible for oxidizing ammonium to nitrite (see Eq. 1, above) and that *Nitrobacter* spp., were responsible for oxidizing nitrite to nitrate (see Eq. 2, above). However, in contrast to this "textbook" knowledge, *Nitrospira*-like bacteria, not *Nitrobacter* spp., have been observed to be the dominant nitrite oxidizers, both in most full-scale wastewater treatment plants and in laboratory scale reactors.

The basic engineering principles for the design of P and N removal treatment facilities have been well established and have been implemented in various configurations including the known UCT process, the known Bardenpho process, the known "$A_2O$" process, and others known to those persons skilled in this technical field. The UCT Process flow configuration is shown in FIG. 1. All of these processes include an anaerobic zone, followed by one or more anoxic zones and one or more aerobic zones. The only systems that would not include an anoxic zone would be those that are not required to and do not nitrify. For all others, it is imperative that any return activated sludge or mixed liquor be denitrified before being returned to the anaerobic zone.

When nitrate or oxygen is discharged to the anaerobic zone, two things may happen, both undesirable:

1. They will prevent fermentation of rbCOD to acetic and propionic acid; and
2. Nitrates or dissolved oxygen (DO) could serve as electron acceptors for PAOs and other organisms that will metabolize the VFA and so deprive the PAOs of the substance that they need to store for growth and phosphorus removal.

Therefore, the UCT and other similar processes utilize internal recycle streams such that minimal nitrate or DO is returned to the anaerobic zone. These pumped recycle stream flow rates must be carefully regulated to assure that the desired process objectives are achieved. These types of EBPR facilities are more complex than conventional activated sludge plants in terms of operation and control and are more expensive to construct, operate, and maintain. Because of the added cost and complexity of multi-stage phosphorus and nitrogen removal systems, many WWTPs, particularly smaller plants less than 5 MGD, have up to now often elected to utilize chemical precipitation instead when needed to meet permit requirements for phosphorus removal.

Organic carbon in the wastewater to be treated is critical for driving biological denitrification and EBPR. Sufficient organic carbon in the form of readily biodegradable chemical oxygen demand (rbCOD) is necessary for denitrifying bacteria to carry out denitrification. To achieve enhanced biological phosphorus removal (EBPR) as depicted in FIG. 2 (as found in EPA Nutrient Control Design Manual EPA/600/R-09/012, dated January 2009), it is necessary to provide the phosphorus accumulating organisms (PAO) with adequate supply of rbCOD in form of volatile fatty acids (VFAs) and appropriate anaerobic conditions free of nitrates. Thus, there is a competition for the available rbCOD between PAOs and denitrifying bacteria. When influent wastewater has a lower concentration of organic carbon the nutrient removal efficiency decreases or an external carbon needs to be added. In order to solve the problem of competition for the limited organic substrate, denitrifying phosphorus accumulating organisms (dnPAO) have received considerable attention.

The dnPAO are distinguished from aerobic PAO (aPAO) by their unique metabolic characteristic. The mechanism of anaerobic phosphate release of dnPAO is the same as that of aPAO. As depicted in FIG. 2, external organic substrate is taken up and converted to polyhydroxyalkanoate (PHA) as a cell energy storage product. Phosphorus is taken up under aerobic conditions by aerobic PAOs (aPAOs) as shown in the FIG. 2, but uptake can also occur under anoxic conditions by dnPAOs.

The denitrifying ability of dnPAOs is a key factor in EBPR process designs for simultaneous denitrification and P removal that can lead to savings in plant operational costs. dnPAO can combine phosphorus removal and denitrification into one process using the same amount of organic carbon substrate. In addition, less aeration is needed which translates into lower energy requirement. Thus, the advantage of selecting for dnPAOs over aPAOs by means of reactor configuration and/or control strategies is very significant. Therefore, selection and enrichment of dnPAO is a key factor in optimizing EBPR and biological nitrogen removal and this is one of the objectives of the current invention.

Many previous investigations have demonstrated that successful EBPR has been achieved using nitrate as a final electron acceptor and had suggested that Candidatus Accumulibacter phosphatis (Ca. Accumulibacter) clades may have the ability to take up P using nitrate. However in more recent research, it was shown that all Ca. Accumulibacter clades failed to take up phosphorus using nitrate in a diluted sludge with a lack of sufficient nitrate reduction capability while "Ca. Accumulibacter" clades successfully took up phosphorus using nitrite as the final electron acceptor. These results were in accordance with previous results showing the absence of nitrate reductase and the presence of nitrite reductase in the Ca. Accumulibacter metagenome. This observation becomes a very important factor in developing process control strategy to select for dnPAOs over aPAOs.

Until recently, it was accepted that phosphorus could only be removed in conventional EBPR plants when the wastewater characteristics were favorable with an rbCOD/TP ratio of more than 15, and focused their discussion on Candidatus Accumulibacter, which was abundant in conventional plants that relied on an external source of VFA and showed no ability to grow and take up phosphorus under anoxic conditions.

However, there are examples of non-conventional EBPR plants which perform very well in which the influent wastewater is discharged directly to the anoxic zone. In some cases, the only source of VFA was from the primary sludge fermenter or the VFA that was formed in the anaerobic zone by fermenting RAS.

One of the EBPR plants studied has a history of phosphorus uptake in the anoxic zone indicating that different PAOs that can take up phosphorus under anoxic conditions, such as Tetrasphaera, might be present.

It was also proposed that the only possible VFA source when fermenting mixed liquor, especially RAS, was from the fermentation of non-PAOs and that PAOs survived better by having a much lower decay rate under anaerobic conditions. Other recent literature points to the possibility that with more prolonged and deeper anaerobic conditions, growth of other PAOs may be favored and their behavior may differ from that of the much researched Accumulibacter species found mostly in conventional biological nutrient removal (BNR) plants. A possible answer may be that the "standard" configuration, where all the primary effluent is passed through the anaerobic zone with little regard to the flow rate or the wastewater characteristics, inadvertently favors the selection of species like Accumulibacter that needs an external supply of VFA. Fermentation of RAS or mixed liquor has resulted in deeper anaerobic conditions such as indicated by an ORP as low as −300 mV, which allows for the growth of fermenting PAOs such as Tetrasphaera, which could produce additional VFA that would allow organisms such as Candidatus Accumulibacter to grow alongside them.

Tetrasphaera encompasses a broad class of bacteria whose diversity has not been well characterized. Still, there are unique traits that some seem to share. All of them can ferment complex organic molecules such as carbohydrates and amino acids (including glucose, glutamate, aspartate) and produce stored carbon in the process. Some Tetrasphaera species can produce VFA (among other metabolites) during fermentation under reduced anaerobic conditions, which could be utilized as substrate by other PAOs. Further, most types of Tetrasphaera are able to denitrify and to couple nitrite/nitrate reduction with phosphorus uptake. Because of these behaviors, the net impact of Tetrasphaera on EBPR could be significant. What is typically modeled as fermentation of rbCOD to VFA would produce storage products to be used for phosphate uptake during anoxic and aerobic phases. If this is the case, significantly more of the available carbon could be used for phosphate removal (i.e., for PAO carbon storage rather than for growth of other heterotrophic organisms (OHO). There is research that indicates Tetrasphaera may play a bigger role than has been accepted up to now. Tetrasphaera has been shown to apparently occupy a slightly different ecological niche compared with 'Candidates Accumulibacter,' contributing to a functional redundancy and stability of the EBPR process. It has been found that the probe-defined Tetrasphaera display different morphologies, and constitute a significant component of plant biomass. Also, it has been shown that active uptake of orthophosphate and formation of polyphosphate took place in much of the observed Tetrasphaera populations in plant biomass.

Based on the review of currently available information it would appear that the most important parameter for optimal EBPR is that a diversity of PAOs must pass through a deep anaerobic zone defined by an ORP below a certain value. Evidence points to an inability of most conventional EBPR plants to reduce the ORP to below this value. Tentative measurements suggest that ORP values that are at or below about −300 mV are linked to the growth of organisms like Tetrasphaera that thrive under those conditions. Tetrasphaera can ferment higher carbon forms, take up phosphorus, and produce VFA, which can be used by other PAOs while also taking up phosphorus under anoxic conditions. Evidence points to an inability of most conventional EBPR plants to reduce the ORP to the low values which are needed to allow Tetrasphaera to thrive. This is particularly true of typical SBR designs.

The ability of Tetrasphaera to ferment higher carbon forms is particularly important for removal of phosphorus from wastewater which do not contain sufficient rbCOD and/or from communities in colder regions which will not contain higher concentrations of VFA by the time is gets to the treatment plants.

In the past 20 years, many smaller (<5 MGD) treatment plants have been built which utilize the sequencing batch reactor (SBR) activated sludge process. Purported advantages of the SBR process include:

1. Fewer tanks and reduced area footprint for the treatment process.
2. Relatively simple to operate.
3. Settling of activated sludge in the settle cycle is under totally quiescent conditions.
4. The batch feeding process should, in theory, provide good selective pressure against the growth of filamentous bacteria which lead to poor settling of the activated sludge floc.

In practice, many SBR plants have not been able to achieve these benefits and operation and performance has been hampered by very poor settling and limited ability to achieve biological phosphorus removal. As a result, these plants have often not been able to provide the intended design capacity and have been unreliable in meeting regulatory requirements for effluent quality. Fundamental design problems include the manner in which the cycles are controlled, the inability to provide truly anaerobic conditions during the entire fill cycle necessary for selecting for PAOs, and the manner in which waste activated sludge is removed from the reactor. The fill, react, settle, and decant cycles as depicted in FIG. 3 of prior technology or "art" are typically based on fixed time periods rather than on dynamic process control based on measured process control variables; and wasting is done from the bottom of the reactors during the settle cycle, thereby wasting the good settling flocculent or "floc" forming bacteria while trapping the filamentous bacteria and foam causing organisms at the surface. In typical SBR designs, an idle period can be included for the times when one reactor has completed its decant cycle and the other reactor is still filling. Such an idle cycle has been typically been used simply to reconcile the total cycle times in two or more SBR tanks where it does not have a defined biological treatment process function and occurs intermittently if at all, and not consistently from one cycle to the next or from one day to another.

The present invention discloses a new method for achieving maximum EBPR and nitrogen removal in an SBR using available carbon in the influent wastewater, and will be understood and fully disclosed by the attached figures taken in conjunction with the written description and claims, as follows.

BRIEF DESCRIPTION OF DRAWINGS

Exemplary embodiments of the technology will become more fully apparent from the following description and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

FIG. 1 is a prior art Flow Schematic for a conventional UCT process;

FIG. 2 is a prior art diagram depicting a biological phosphorus removal process;

FIG. 3 is a prior art schematic diagram of a typical sequencing batch reactor (SBR) design;

FIG. 4 is a detail drawing depicted elements and function of an Anaerobic Feed Cycle in an improved SBR process, according to an embodiment of the present invention;

FIG. 5 is a typical 24-hour chart of ORP vs. time in a 2-SBR system, according to an embodiment of the present invention;

FIG. 6 is a schematic diagram of a in an improved SBR process with a control sequence to achieve enhanced biological phosphorus removal, according to an embodiment of the present invention; and FIG. 7 is a SBR process control logic diagram of the in the improved SBR process, according to an embodiment of the present invention.

Reference characters included in the above drawings indicate corresponding parts throughout the several views, as discussed herein. The description herein illustrates one or more preferred and alternative embodiments of the invention, and the description herein is not to be construed as limiting the scope of the invention in any manner. It should be understood that the above listed figures are not necessarily to scale and that the embodiments may be illustrated by fragmentary views, graphic symbols, diagrammatic or schematic representations, extended angles, and center lines. Also, details that are not necessary for an understanding of the present invention by one skilled in the technology of the invention, or render other details difficult to perceive, may have been omitted.

DETAILED DESCRIPTION OF SPECIFIC EMBODIMENTS

Referring to FIGS. 4 through 7, a process for municipal and industrial waste water in a batch reactor of the present invention is disclosed, as embodied in a method for processing an activated sludge for a high efficiency biological removal of phosphorus and nitrogen in sequential steps within a batch reactor or tank.

The innovative process and control method of the present invention can be applied to "enhanced biological phosphorus removal", or EBPR treatment process designs which utilize a "sequencing batch reactor" or SBR process 1. The technical description of the innovation will be provided here by way of example. However, it should be noted that other similar process configurations could be utilized in applying this method. FIG. 3 shows a process schematic of a typical sequencing batch reactor treatment facility or plant. The typical SBR treatment facility 3, utilizes two or more SBR tanks 10 or reactors, so that while one tank is filling the other tank(s) are carrying out reacting, settling, and decanting cycles, in sequence as is conventional.

The present invention includes a method for achieving maximum EBPR and nitrogen removal in an improved SBR process 10 using available carbon in a wastewater influent 11, by creating fermentation conditions in a Ferment Cycle 180 between the end of a series of aerated reaction cycles and followed by an Anaerobic Fill Cycle 100. New wastewater influent is introduced during each Anaerobic Fill Cycle into the lower portion of the vessel through a plurality of ports design to mix the wastewater horizontally into a settled bed of activated sludge 14, which is present in the lower portion of the SBR tank 4, or vessel as a result of the preceding Settle, Decant and Ferment Cycles. A conventional method for introducing an influent into the lower portion of a vessel in this manner is described in U.S. Pat. No. 4,645,592.

The introduction of the wastewater influent 11 into the settled activated sludge bed where fermentation conditions already are present, allows for additional uptake of VFAs by PAOs under deeply anaerobic conditions during the Fill cycle and also provides for additional selective pressure favoring the growth of PAOs. FIG. 4 presents a detailed schematic drawing of the Anaerobic Feed Cycle 100.

FIG. 5 shows the ORP vs. time for a two-reactor SBR system over a typical, 24-hour period 9. Most preferably, anaerobic fill cycles will occur after a fermentation cycle in which the ORP has reached levels of −300 mV or less for a significant portion of the fermentation cycle. As the influent wastewater 11 is introduced into the settled bed of activated sludge 14, the ORP continues to decrease well below −300 mV, as in the example shown in FIG. 5. After filling, the aerated React Cycle begins and the "oxidation reduction potential" or "ORP" rises rapidly to the +50 to 100 mV range (and in some cases as high as +200 mV). At the end of React, the Settle Cycle begins and the ORP drops rapidly. Sometime after the activated sludge bed has completely settled and normally toward the end of the Decant Cycle or the beginning of the Ferment Cycle, an inflection point 24 will occur in the ORP vs. time curve which indicates that nitrate has be fully depleted from within the settled bed. At this point fermentation can begin and the ORP again drops rapidly.

The inflection point 24 is further defined as when the calculated derivative value of the rate of change of the input flow volume of the air stream into the tank needed to maintain the low-range ORP setpoint reaches a "flattening" or horizontally tending derivative value indicating that conversion of the ammonia nitrogen in the influent wastewater content to a nitrite or to a nitrate is complete, as shown in FIG. 5.

In the preferred embodiment of the present invention, the ORP will reach −300 mV or less and remain there for approximately one to one and a half hours during at least one cycle per day in each SBR and preferable two or more cycles per day in each SBR.

A schematic diagram illustrating the cycle steps which make up a complete SBR cycle under the present invention is shown in FIG. 6, and with a process control logic diagram of a preferred embodiment of the present invention shown in FIG. 7 and discussed as follows:

Anaerobic Fill Cycle 100—The wastewater influent 10 is introduced into the lower portion of the SBR under anaerobic conditions (no aeration provided). Deeply anaerobic conditions carrying over from the preceding Ferment Cycle are maintained throughout the Fill Cycle to allow for uptake of VFA substrate by PAOs (including dnPAOs) to support EBPR in the subsequent aerated cycle. The anaerobic fill time will be determined based on volume of wastewater available to be fed, liquid level 15 in the SBR tank, time duration, the ORP value of the reactor contents, the rate of change of the ORP value of the reactor contents, pH, and/or the status of the other SBR reactor(s). Termination of the Anaerobic Fill Cycle 105 initiates the following Aerated React Cycles, preferably after a programmable time delay period:

React Cycle Phase 1 110—In this cycle, the SBR tank contents 16 are completely mixed so as to maintain a "dissolved oxygen" or "DO" level near 0 mg/L. Mixing can be achieved by mechanical mixing or by maintaining an air flow rate which is the minimum amount sufficient to provide completed mixing but is insufficient to provide measurable DO as would be required to meet the demand for oxygen. ORP is continually monitored and logged by the microprocessor-based control system. When substantially all of the nitrate and nitrite nitrogen which remains from the previous React Cycle Phase 1 has been denitrified, there will be a change in the rate of change in the ORP versus time curve which can be used to determine when substantially all of the nitrate and nitrite present has been denitrified. When the microprocessor-based control system detects the inflection point 24 in the rate of change in ORP versus time as shown in FIG. 6, a Terminate React Cycle Phase 1 115 terminates the React Cycle Phase 1, preferably after an operator adjustable time delay.

React Cycle Phase 2 120—In this cycle, aeration is maintained with air flow regulated to maintain a selected low-range DO setpoint (for example 0.5 to 1.5 mg/L). The air flow rate is continually monitored and logged by the microprocessor-based control system. When substantially all of the ammonia nitrogen in the influent wastewater has been oxidized to nitrite or nitrate, there will be a significant drop in the air flow rate required to maintain the selected DO setpoint. When the microprocessor-based control system again detects the inflection point 24 in the rate of air vs. time, as shown in FIG. 6, a Terminate Aerated React Cycle Phase 2 125 terminates React Cycle Phase 2, preferably after an operator adjustable time delay.

React Cycle Phase 3 130—In this cycle, aeration is maintained with air flow regulated to maintain a selected DO setpoint which will maximize phosphorus uptake (for example greater than 1.5 mg/L). The air flow rate is continually monitored and logged by the microprocessor-based control system. When substantially all of the stored carbon substrate and any residual ammonia nitrogen in the influent wastewater has been oxidized, there will be another significant drop in the air flow rate required to maintain the selected DO setpoint. When the microprocessor-based control system again detects the inflection point 24 in the rate of air vs. time, as shown in FIG. 6, a Terminate Aerated React Cycle Phase 3 135 terminates React Cycle Phase 3, preferably after an operator adjustable time delay.

Post-React Surface Wasting Cycle 140—In this cycle, a specific volume of mixed liquor will be withdrawn from the surface of the reactor and wasted from the system. A Begin Surface Wasting Cycle 145 then initiates a Surface Wasting Cycle 150, some length of time after the end of the aerated React Cycle Phase 3, and would be terminated before the beginning of a Settle Cycle 160, with a Terminate Surface Wasting Cycle 155. A minimum level of aeration is maintained during the Post-React Surface Wasting Cycle, which is sufficient to provide mixing of the reactor contents 16. Surface wasting will preferably be initiated as least once per day in each SBR tank 10.

Settle Cycle 160—In this cycle, all aeration and mixing are stopped with a Terminate Settle Cycle 165 to provide quiescent conditions for settling of the mixed liquor 13, so that clear supernatant can be withdrawn in a Decant Cycle 170. The Decant Cycle can begin anytime after the initiation of the Settle Cycle 160. The duration of the Settle Cycle can be controlled by time or by monitoring a liquid-solids interface 17 to determine when there is a sufficient depth of a clear liquid 18 in the reactor to allow for the Decant Cycle to begin.

Decant Cycle 170—In this cycle, the clear liquid 18 as a clear treated effluent 19 is withdrawn from the top of the SBR tank 10 through a decanter mechanism 20. The amount of clear treated effluent withdrawn is based on a specified volume or depth and can also be adjusted automatically based on the status of the other reactor(s).

Ferment Cycle 180—The Ferment Cycle begins at the Terminate Decant Cycle 175, which ends the Decant Cycle 170, and continues until the start of the next Anaerobic Fill Cycle 100 in this SBR tank 10. The Ferment Cycle will normally be un-mixed and will lead to conditions which support fermentation within the settled bed of activated sludge 14. The minimum and maximum durations of the Ferment Cycle will be determined based on time, the ORP value within the settled bed, the rate of change of the ORP value within the settled bed of activated sludge, pH, the status of the other SBR tank reactor(s), and/or the volume of influent wastewater 11 available to be treated. Most preferably, each SBR tank should undergo at least one period of time which promotes fermentation within the settled bed of activated sludge during each 24-hour period and preferably more, and ideally during each SBR cycle herein described. Fermentation conditions can begin to occur during the Settle Cycle 160 and/or the Decant Cycle 170 and will continue through the Ferment Cycle 180 and the Anaerobic Fill Cycle 100. Alternatively, the Decant Cycle could occur anytime after the start of the Settle Cycle and before the end of the Ferment Cycle.

It is anticipated that the fermentation conditions and anaerobic fill period together with a control system operating in the manner described will provide strong selective pressure to favor the growth of dnPAO. As previously noted, this is an important factor in efficiently utilizing the available organic carbon to maximize both P (phosphorus) removal and N (nitrogen) removal, while at the same time achieving significant energy savings. Further energy savings are realized as compared to the prior UCT and similar processes, since no internal recycle pumping is necessary. Bacterial species identification and quantification using q-PCR, can be used to verify and optimize the process control logic model and control algorithms. With application of the present invention, the development of activated sludge bacteria consortia with high settling velocities are realized, which enable energy efficient N and P removal in smaller reactor tanks. Specific preferred embodiments of the present invention include some or all of the following elements:

1. The incorporation of one or more fermentation cycles within a SBR tank 10 during each 24-hour period 9 to allow for fermentation conditions to develop within the settled mixed liquor bed or settled bed of activated sludge 14 where fermentation conditions can be monitored and controlled using oxidation-reduction potential (ORP) measurements in the settled mixed liquor. Fermentation conditions are characterized by having an ORP of less than −200 mV and preferably −300 mV or less for a substantial portion of the fermentation period, which can include a portion of each Settle Cycle 160 and each Decant Cycle 170, and each or all of the Ferment Cycles 180, and each or all of the Anaerobic Fill Cycles 100.

2. Introducing the influent wastewater 11 into the portion of the SBR tank 4 near the floor of the SBR tank under conditions which create mixing and sufficient fluidization within the settled activated sludge or aerobic granular sludge bed to provide good contact of the mixed liquor 13 with the rbCOD in the influent wastewater.

3. A means of aerating and mixing the entire depth of the SBR tank 4 using fine bubble diffusers located in the lower portion of the tank as comprising the influent water feed manifold 12.

4. A means of withdrawing a portion of the mixed liquor 13 including suspended solids near the surface of the tank, while the tank contents are being mixed using the diffused aeration system of the influent water feed manifold 12.

5. A means of withdrawing (decanting) treated wastewater as the clear treated effluent 19 from the SBR tank 4 with the decanter mechanism 20 after the Anaerobic Fill Cycle 100, the aeration steps of the React Cycle Phase 1 110, the React Cycle Phase 2 120, and the React Cycle Phase 3 130, and the Settle Cycle 160 all have been completed.

FIG. 5 is a graph of ORP vs. time curve of a design of a preferred embociment of the improved SBR process 10 having two-tank sequencing batch reactors (SBR) incorporating the present invention and a control sequence to achieve enhanced biological phosphorus removal while maximizing the growth of dnPAOs over PAOs to maximize nitrogen removal with the available carbon in the influent wastewater 11. The following describes the dynamic process control methodologies to be incorporated into the present invention for each of the SBR cycles. Key objectives of the present invention are to provide improvements on the conventional SBR process, and these improvements include:

1) a deeply anaerobic fermentation period (Ferment Cycle 180) during one or more complete cycles in each reactor, preferably in each 24-hour period 9;

2) introduce the influent wastewater 11 into the settled mixed liquor bed or settled bed of activated sludge 14, preferably immediately after a deeply anaerobic period with sufficient mixing energy to provide good contact of the wastewater constituents with the bacteria in the settled bed present at the beginning of the Anaerobic Fill Cycle 100 of the SBR tank 4;

3) efficient low dissolved oxygen dynamic control during the aerated React Cycle Phase 1 110, React Cycle Phase 2 120 and React Cycle Phase 3 130;

4) surface wasting of excess activated sludge microorganisms during an aerated Post-React Surface Wasting Cycle 140; and 5) provide a quiescent Settle Cycle 160 following the React Cycles with a Decant Cycle 170 to decant clear treated effluent 19 after a defined period of time where fermentation conditions in the settled activated sludge bed as defined by the depletion of nitrate within this bed during the Settle Cycle and/or the Decant Cycles and continue into the below-described Ferment Cycle, in which deeply anaerobic conditions are achieved (ORP values of −300 mV or less are achieved) prior to the subsequent Anaerobic Fill Cycle.

Embodiments of the present invention preferably include;

1) creation of conditions which promote fermentation within the settled mixed liquor during the Settle, Decant, Ferment, and Fill Cycles, 2) monitor and control the occurrence and duration of these fermentation conditions using oxidation-reduction potential (ORP) process variable measurements 3) control of the oxygen supplied during the aerated React Cycle to select for the growth denitrifying phosphate accumulating organisms (PAOs) and activated sludge with excellent settling properties, 4) a method of wasting excess activated sludge bacteria from the mixed liquor which further selects for PAOs in an activated sludge with excellent settling properties. In the sequencing batch reactor activated sludge process to which the present invention is most applicable, treatment and clarification take place in the same tank in a sequential manner.

In the present invention, selective wasting of excess activated sludge from the surface of the reactor under appropriate conditions during an aerated and mixed post-react cycle also provides a strong selective mechanism for good settling activated sludge rich in PAOs and dnPAOs.

In addition, the present invention monitors and controls the timing and duration of conditions which will promote fermentation within the settled mixed liquor during the Settle, Decant, Ferment and Fill cycles to support the diversity of PAOs that are needed to optimize EBPR and nitrogen removal with the carbon sources available in the wastewater.

Also additionally in the present invention, dynamic multivariable aeration control during the aerated React Cycles will further enhance nutrient removal and energy efficiency.

Furthermore, the present invention allows engineers and plant operators to better exploit the microbial communities which carry out enhanced biological phosphorus removal (EBPR) and nitrification/denitrification (NdN) to protect the environment and to significantly reduce the amount of energy and chemicals consumed in removing nutrients from wastewater discharges.

The present invention also serves to maximize EBPR, while at the same time achieving the maximum biological nitrogen removal which can be obtained with the available carbon in the influent wastewater. The system could be readily implemented in both new and existing treatment facilities and will be applicable to both large and small wastewater treatment plants.

Additionally, the present invention will change the selective pressures on the microbial communities which make up the activated sludge in an SBR used for biological nutrient removal, and thus the microbial population composition is expected to change. The changes are expected to result in microbial population consortia which are more effective at using the influent wastewater carbon to optimized phosphorus and nitrogen removal. An important fundamental and scientific aspect of the present invention is to relate the changes in the reactor conditions and performance with changes in the microbial population responsible for ammonia and nitrite oxidation and for EBPR.

Well established molecular biology methods can be used to characterize the composition and dynamics of microbial communities in these systems and to identify the specific organisms which predominate in the different process reactor environments. Exemplary embodiments of the technology will be best understood by reference to the drawings, wherein like parts are designated by like numerals throughout. It will be readily understood that the components of the technology, as generally described and illustrated in the figures herein, could be arranged and designed in a wide variety of different configurations.

Thus, the detailed description of the embodiments of the apparatus, system, and method disclosed herein is not intended to limit the scope of the invention, as claimed, but is merely representative of exemplary embodiments of the technology. While the various aspects of the embodiments are presented in drawings, the drawings are not necessarily drawn to scale unless specifically indicated. Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Also notably, the terms "approximately" or "approximate" are employed herein throughout, including this detailed description and the attached claims, with the understanding that the terms denote a level of exactitude commensurate with the skill and precision common within the particular field of endeavor, as applicable. Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

Thus, the claims following this Detailed Description are hereby expressly incorporated into this Detailed Description, with each claim standing on its own as a separate embodiment. This disclosure includes all permutations of the independent claims with their dependent claims. Recitation in the claims of the term "first" with respect to a feature or element does not necessarily imply the existence of a second or additional such feature or element. Elements recited in means-plus-function format are intended to be construed in accordance with 35 U.S.C. § 112 Para. 6.

Also, it will be apparent to those having skill in the art that changes may be made to the details of the above-described embodiments without departing from the underlying principles of the technology. While specific embodiments and applications of the present technology have been illustrated and described, it is to be understood that the technology is not limited to the precise configuration and components disclosed herein. Various modifications, changes, and variations which will be apparent to those skilled in the art may be made in the arrangement, operation, and details of the methods and systems of the present technology disclosed herein without departing from the spirit and scope of the technology. Therefore, the invention is not to be limited except by the following claims, as appropriately interpreted in accordance with the doctrine of equivalents.

What is claimed is:

1. A method for removing phosphorus and nitrogen in an activated sludge wastewater treatment system with a multiple of tanks, each of the multiple of tanks operated as a sequencing batch reactor, and each of the multiple of tanks having an aeration and mixing system, said method comprising the steps of:

a) treating an influent wastewater in at least one of the multiple of tanks operated as a sequencing batch reactor, the influent wastewater within the at least one tank containing phosphorus and nitrogen, and a fermentation cycle achieves a anaerobic condition in a settled activated sludge bed of the at least one tank, as indicated by an oxygen reduction potential value of less than negative 200 mV;

b) treating the influent wastewater containing phosphorus and nitrogen in the at least one tank following the fermentation cycle, by filling the tank with said influent wastewater in an anaerobic fill cycle under said anaerobic condition without an aeration of a content of the at least one tank;

c) treating said influent wastewater content in the at least one tank, where a react cycle first phase follows the anaerobic fill cycle, the react cycle first phase includes mixing the content of the at least one tank after ceasing the filling of the sequencing batch reactor without an aeration of a content of the at least one tank;

d) maintaining a constant concentration of a dissolved oxygen in the content of the tank at a low-range setpoint of approximately 0.5 mg/L to 1.5 mg/L in the at least one tank during a react cycle second phase by controlling an input flow volume of an air stream based on a measured value of dissolved oxygen in the content of the at least one tank;

e) ceasing said react cycle second phase when a derivative of rate of change of the input flow volume of the air stream into the at least one tank needed to maintain the low-range setpoint reaches a first derivative value indicating that conversion of an ammonia nitrogen in the influent wastewater content to a nitrite or to a nitrate is complete;

f) maintaining a constant concentration of the dissolved oxygen in the content of the tank at a high-range setpoint of approximately greater than 1.5 mg/L in the at least one tank in a react cycle third phase, by controlling the input flow volume of the air stream into the at least one tank based on the measured value of dissolved oxygen in the influent wastewater content of the sequencing batch reactor;

g) ceasing said react cycle third phase when a derivative of rate of change of the input flow volume of the airstream into the tank needed to maintain the selected high-range setpoint reaches a second derivative value indicating that most all of a stored carbon substrate in the influent wastewater and most any residual ammonia nitrogen in the influent wastewater has been oxidized;

h) initiating a post-react surface wasting cycle at the end of the react cycle third phase by withdrawing a waste volume of a mixed liquor component of the influent wastewater content from the surface of the at least one tank and discharging the waste volume of a mixed liquor component from the activated sludge wastewater treatment system, while maintaining a input flow volume of the airstream to an aeration diffuser array as needed to maintain a mixing of the influent wastewater content, and discontinuing the post-react surface wasting cycle after the waste volume is withdrawn to begin a settle cycle in which the content of the at least one tank settles within the at least one tank;

i) beginning a decant cycle by withdrawing a clarified treated wastewater from a top portion of the at least one tank, in which the clarified treated wastewater is discharged from the at least one tank; and j) maximizing utilization of a stored carbon substrate in phosphate accumulating organisms under anoxic conditions in the content of the at least one tank, and thereby, a selection of denitrifying phosphate accumulating organisms over non-denitrifying phosphate accumulating organisms is maximized in order to further maximize the removal of phosphorus and nitrogen in the activated sludge wastewater treatment system.

2. The method of claim 1, additionally wherein:

a microprocessor-based monitoring and control system is utilized to control operation of the sequencing batch reactors in the activated sludge wastewater treatment system, the microprocessor-based monitoring and control system determines the first derivative value and the second derivative value; and the microprocessor-based monitoring and control system maximizes a utilization of the stored carbon substrate in phosphate accumulating organisms under low dissolved oxygen or anoxic conditions, and thereby enhances a selection of denitrifying phosphate accumulating organisms over non-denitrifying phosphate accumulating organisms, in order to further maximize the removal of phosphorus and nitrogen in the activated sludge wastewater treatment system using available carbon in the content of the at least one tank.

3. The method of claim 1, additionally wherein, the duration of the said anaerobic fill cycle is continued until a predetermined volume of influent wastewater is fed into the tank.

4. The method of claim 1, additionally wherein the duration of the said anaerobic fill cycle is continued until a predetermined value of the oxygen reduction potential measurement of the content of the at least one tank is reached.

5. The method of claim 1, additionally wherein the duration of the said anaerobic fill cycle is continued until a predetermined value of a derivative of the measured oxygen reduction potential value versus time is reached.

6. The method of claim 1, additionally wherein the duration of the said react cycle first phase is continued until a predetermined value of a derivative of the measured oxygen reduction potential value versus time is reached.

7. The method of claim 1, additionally wherein the surface wasting cycle is initiated at a predetermined time after the beginning of the aerated react cycle but before the end of the aerated react cycle and continuing until a predetermined depth or volume of a mixed liquor has been withdrawn from a surface of the content of the tank.

8. The method of claim 1, additionally wherein the ferment cycle follows the decant cycle and continues until the oxygen reduction potential value of content of the at least one tank has reached a predetermined setpoint, a second derivative of the rate of change of the oxygen reduction potential value of the content of the at least one tank has reached a predetermined value, a pH setpoint is reached, or until influent wastewater is available in sufficient quantity to require a start of the anaerobic fill cycle.

9. The method of claim 1, additionally wherein two or more sequencing batch reactors operate in parallel such that one tank operated as a sequencing batch reactor is filling in the anaerobic fill cycle or filling in the aerated fill cycle, while the other tanks in multiple of tanks of the activated sludge wastewater treatment system is each operated as sequencing batch reactors, and each of the multiple of tanks complete in succession, including the aerated react cycle, the post react surface wasting cycle, the settle cycle, the decant cycle, and the ferment cycle.

10. The method of claim 1, additionally wherein a cycle duration of the settle cycle is determined by monitoring the depth of a solids-liquid interface in the contents of the at least one tank, and initiating the decant cycle when a sufficient depth of a clarified treated wastewater in the tank is available for discharge from the at least one tank.

* * * * *